(12) United States Patent
Zhao et al.

(10) Patent No.: US 9,992,066 B2
(45) Date of Patent: Jun. 5, 2018

(54) DATA UPDATING METHOD, DEVICE FOR VEHICLE DIAGNOSING APPARATUS AND VEHICLE DIAGNOSING APPARATUS

(71) Applicant: Robert Bosch GmbH, Stuttgart (DE)

(72) Inventors: Yulun Zhao, Guangdong (CN); Jinsheng Liu, Guangdong (CN); Guobo Wang, Guangdong (CN)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 14/980,310

(22) Filed: Dec. 28, 2015

(65) Prior Publication Data
US 2016/0191307 A1 Jun. 30, 2016

(30) Foreign Application Priority Data
Dec. 29, 2014 (CN) .......................... 2014 1 0837528

(51) Int. Cl.
*G06F 15/177* (2006.01)
*G06F 15/16* (2006.01)
*H04L 12/24* (2006.01)
*G07C 5/00* (2006.01)
*H04L 29/08* (2006.01)
*G07C 5/08* (2006.01)

(52) U.S. Cl.
CPC .............. *H04L 41/082* (2013.01); *G07C 5/00* (2013.01); *G07C 5/0808* (2013.01); *H04L 67/12* (2013.01); *G07C 2205/02* (2013.01)

(58) Field of Classification Search
CPC ......... H04L 41/082; H04L 67/12; G07C 5/00; G07C 5/0808; G07C 2205/02
USPC ......................................................... 709/221
See application file for complete search history.

(56) References Cited

U.S. PATENT DOCUMENTS

| 6,757,712 | B1 * | 6/2004 | Bastian ............. | B64D 11/0015 709/203 |
| 7,200,390 | B1 * | 4/2007 | Henager ............... | H04W 8/245 455/412.1 |
| 7,355,509 | B2 * | 4/2008 | Rennie ................... | G08G 1/017 340/426.15 |

(Continued)

FOREIGN PATENT DOCUMENTS

CN 102263805 A 11/2011

*Primary Examiner* — Melvin H Pollack
(74) *Attorney, Agent, or Firm* — Maginot, Moore & Beck LLP

(57) ABSTRACT

A method for vehicle diagnosing apparatus comprises: providing a diagnosing apparatus terminal which receives the latest data edition information of one or more data packets pushed to the diagnosing apparatus terminal; the diagnosing apparatus terminal comparing the latest data edition information of the data packets with the current data edition information of the data packets respectively so as to determine whether the latest data edition of each data packet is superior to the current data edition of this data packet; if there is any data packet whose latest data edition is superior to the current data edition, the diagnosing apparatus terminal prompting that there is an update for the data edition; the diagnosing apparatus terminal downloading the data packet for which there is an update; and the diagnosing apparatus terminal installing this data packet and replacing the current data edition information with the latest data edition information.

10 Claims, 1 Drawing Sheet

(56) References Cited

U.S. PATENT DOCUMENTS

| | | | |
|---|---|---|---|
| 7,548,961 B1* | 6/2009 | Fernandez | G06Q 30/02 709/203 |
| 8,169,897 B2* | 5/2012 | Guha | H04L 45/00 370/229 |
| 8,233,389 B2* | 7/2012 | Yim | H04L 47/14 370/229 |
| 8,417,860 B2* | 4/2013 | Choi | H04L 67/12 710/100 |
| 8,467,324 B2* | 6/2013 | Yousefi | H04N 7/183 370/310.2 |
| 8,498,771 B2* | 7/2013 | Dwan | G07C 5/008 701/29.1 |
| 8,537,747 B2* | 9/2013 | Madhavan | G07C 5/008 370/328 |
| 8,627,075 B2* | 1/2014 | Ikeda | H04B 5/02 455/41.1 |
| 8,627,402 B2* | 1/2014 | Cohen | H04L 67/34 705/21 |
| 8,718,797 B1* | 5/2014 | Addepalli | H04W 4/046 700/17 |
| 8,819,182 B2* | 8/2014 | Howarter | G06F 17/30017 348/148 |
| 9,378,601 B2* | 6/2016 | Ricci | B60Q 1/00 |
| 9,418,040 B2* | 8/2016 | Cordray | G06F 15/173 |
| 9,428,197 B2* | 8/2016 | Chen | B60R 16/037 |
| 9,538,374 B2* | 1/2017 | Kaufmann | G07C 5/008 |
| 9,577,866 B2* | 2/2017 | Rogers | G07C 5/008 |
| 9,601,015 B2* | 3/2017 | Rennie | G08G 1/0967 |
| 9,747,096 B2* | 8/2017 | Searle | H04L 41/082 |
| 2003/0138475 A1 | 7/2003 | Chen | |
| 2006/0101311 A1 | 5/2006 | Lipscomb et al. | |
| 2007/0083303 A1* | 4/2007 | O'Sullivan | G07C 5/006 701/31.4 |
| 2008/0071891 A1* | 3/2008 | Cohen | H04L 63/20 709/221 |
| 2008/0137569 A1 | 6/2008 | Sang et al. | |
| 2010/0082559 A1* | 4/2010 | Sumcad | G06F 8/65 707/695 |
| 2011/0225259 A1* | 9/2011 | Quinn | G06F 8/65 709/217 |
| 2013/0282238 A1* | 10/2013 | Ricci | G06F 3/0484 701/41 |
| 2014/0052330 A1* | 2/2014 | Mitchell | G06F 8/65 701/31.5 |
| 2014/0068713 A1* | 3/2014 | Nicholson | H04W 12/06 726/3 |
| 2016/0071333 A1* | 3/2016 | Haidar | G07C 5/006 701/29.3 |
| 2016/0294614 A1* | 10/2016 | Searle | H04L 41/082 |
| 2017/0063566 A1* | 3/2017 | Seminario | H04L 12/2816 |
| 2017/0093643 A1* | 3/2017 | Ricci | H04L 41/14 |
| 2017/0257841 A1* | 9/2017 | Skaaksrud | H04W 12/06 |

* cited by examiner

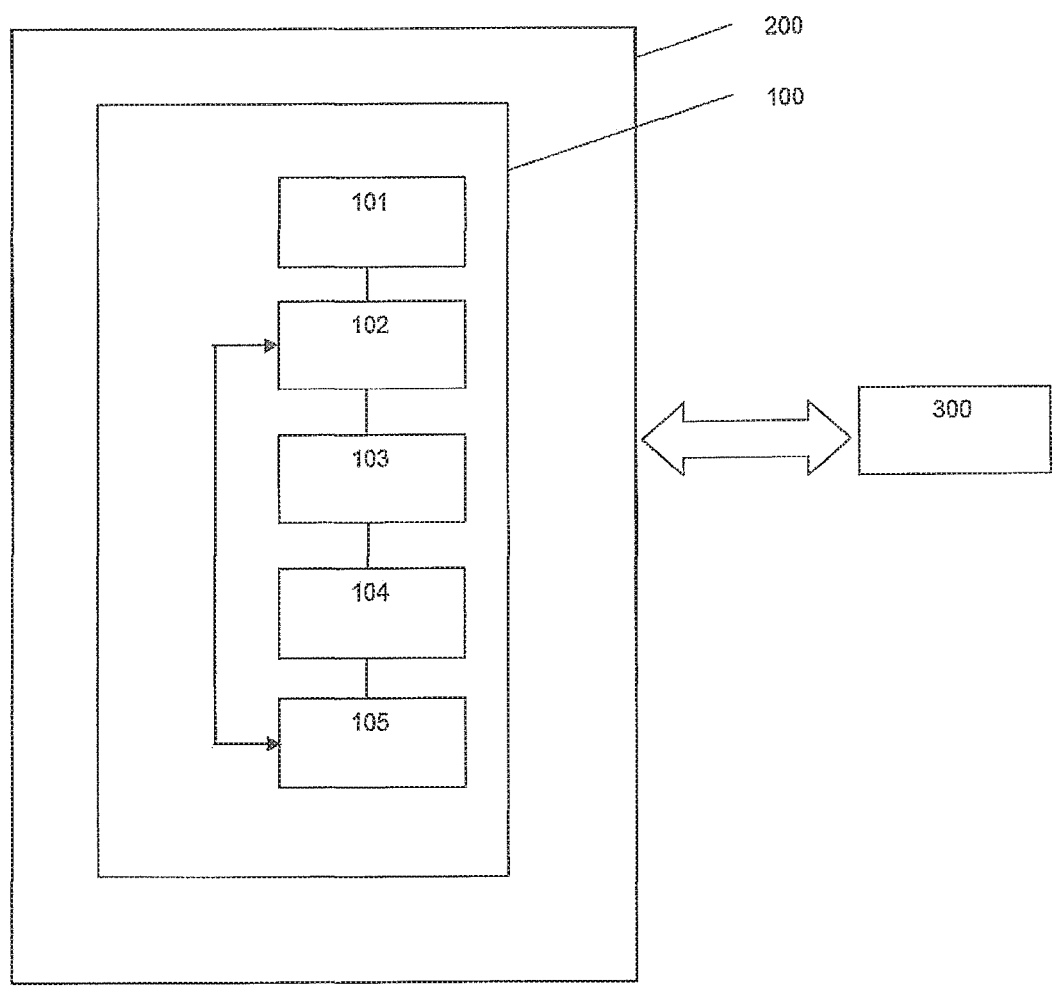

DATA UPDATING METHOD, DEVICE FOR VEHICLE DIAGNOSING APPARATUS AND VEHICLE DIAGNOSING APPARATUS

This application claims priority under 35 U.S.C. § 119 to patent application no. CN 201410837528.4 filed on Dec. 29, 2014 in China, the disclosure of which is incorporated herein by reference in its entirety.

FIELD OF THE INVENTION

The invention relates to the field of data updating, in particular, to a data updating method, device for vehicle diagnosing apparatus and a vehicle diagnosing apparatus.

BACKGROUND

With the increasing improvement on design and production level in modern automobile industry, higher demands have been raised on the maintenance and detection of vehicles. In the malfunction self-diagnosing technology in terms of automobile electronic control, vehicle diagnosing apparatuses have been widely used. By means of these apparatuses, automobile maintenance staff can determine the technical conditions of automobile with no need to disassemble automobile or with a mere need to remove only a few parts. Then, the malfunctioning parts can be ascertained and the malfunction reasons can be determined so that a purposive maintenance can be performed on malfunctions of automobile electronic control system. Meanwhile, since the speed at which automobile manufactures bring forth the new generations of automobile is becoming faster and faster, the demand of updating data of vehicle diagnosing apparatus is also becoming more and more frequent. Existing vehicle diagnosing apparatuses typically acquire diagnosing data of the latest vehicle model by way of data updating so as to achieve synchronization with the latest vehicle model developed by automobile manufacturers.

However, both the principle and operation process of updating data for existing vehicle diagnosing apparatuses are complicated, which requires that users grasp certain knowledge of updating operation. This could be difficult for common users. Moreover, the updating of data has to be initiated by users actively. However, it would be very difficult for common users to realize when it is required to update data for diagnosing apparatuses, thus making the data in the vehicle diagnosing apparatuses not updated timely. All these above problems will have certain influence on the efficiency of servicing and inspecting automobiles.

SUMMARY OF THE INVENTION

The object of the invention is to provide a data updating method for vehicle diagnosing apparatus, through which operation is made simple and data can be updated timely, thus greatly shortening the time of updating data for diagnosing apparatus and thereby improving working efficiency for users.

Another object of the invention is to provide a data updating device for vehicle diagnosing apparatus, which is simple in structure and improves time-effectiveness of data updating of vehicle diagnosing apparatus without increasing cost of apparatus, thus increasing utilization of vehicle diagnosing apparatus.

Further another object of the invention is to provide a vehicle diagnosing apparatus which is simple in structure and is easy to use and service.

In order to achieve the above objects, the invention provides a data updating method for vehicle diagnosing apparatus, which comprises the following steps:
(1) providing a diagnosing apparatus terminal which, when connected to a data server via network, receives the latest data edition information of one or more data packets pushed to the diagnosing apparatus terminal by the data server;
(2) the diagnosing apparatus terminal comparing the latest data edition information of the one or more data packets with the current data edition information of the one or more data packets respectively so as to determine whether the latest data edition of each data packet is superior to the current data edition of this data packet;
(3) if there is any data packet whose latest data edition is superior to the current data edition of this data packet, the diagnosing apparatus terminal prompting that there is an update for the data edition of this data packet;
(4) the diagnosing apparatus terminal downloading the data packet for which there is an update for the data edition; and
(5) the diagnosing apparatus terminal installing this data packet and replacing the current data edition information of this data packet in the diagnosing apparatus terminal with the latest data edition information of this data packet.

Optionally, when there is a plurality of data packets, the plurality of data packets are classified based on the brands of vehicles.
at step (1), when the diagnosing apparatus terminal which is connected to the data server via network, the diagnosing apparatus terminal receives the latest data edition information of a plurality of data packets classified based on the brands of vehicles pushed to the diagnosing apparatus terminal by the data server;
at step (2), the diagnosing apparatus terminal compares the latest data edition information of the data packet of each vehicle brand with the current data edition information of the data packet of this vehicle brand so as to determine whether the latest data edition of the data packet of each vehicle brand is superior to the current data edition of the data packet of this vehicle brand;
at step (3), if there is any vehicle brand whose latest data edition of the data packet is superior to the current data edition of the data packet of this vehicle brand, the diagnosing apparatus terminal prompts that there is an update for the data edition of the data packet of this vehicle brand;
at step (4), the diagnosing apparatus terminal downloads the data packet of the vehicle brand for which there is an update for data edition; and
at step (5), the diagnosing apparatus terminal installs the data packet of this vehicle brand and replaces the current data edition information of the data packet of this vehicle brand in the diagnosing apparatus terminal with the latest data edition information of the data packet of this vehicle brand.

Optionally, a determining step is also comprised before step (5) for determining whether the downloaded data packet is complete; if the data packet is not complete, the downloading is continued until the data packet is complete; and/or an informing step is also comprised after step (5) for informing the user of the installation result of the data packet.

Optionally, at step (4), the diagnosing apparatus terminal downloads the data packet corresponding to the latest data edition in an automatic way or according to an instruction; when in an automatic way, the diagnosing apparatus terminal automatically downloads the data packet for which there is an update for data edition; and when according to an instruction, the diagnosing apparatus terminal downloads the data packet for which there is an update for data edition after receiving a downloading instruction.

Further, the invention also provides a data updating device for vehicle diagnosing apparatus, which is provided in a diagnosing apparatus terminal and comprises:

an information receiving module for receiving the latest data edition information of one or more data packets pushed to the diagnosing apparatus terminal by a data server when the diagnosing apparatus terminal is connected to the data server via network;

a comparing module for comparing the latest data edition information of the one or more data packets with the current data edition information of the one or more data packets in the diagnosing apparatus terminal respectively so as to determine whether the latest data edition of each data packet is superior to the current data edition of this data packet;

a prompting module for, in case that there is any data packet whose latest data edition is superior to the current data edition of this data packet, prompting that there in an update for the data edition of this data packet;

a downloading module for downloading the data packet for which there in an update for data edition to the diagnosing apparatus terminal; and a data updating module for installing this data packet to the diagnosing apparatus terminal and replacing the current data edition information of this data packet in the diagnosing apparatus terminal with the latest data edition information of this data packet.

Optionally, when there is a plurality of data packets, the plurality of data packets are classified based on the brands of vehicles. At this time, the data updating device for vehicle diagnosing apparatus comprises:

an information receiving module for receiving the latest data edition information of a plurality of data packets classified based on the brands of vehicles pushed to the diagnosing apparatus terminal by a data server when the diagnosing apparatus terminal is connected to the data server via network;

a comparing module for comparing the latest data edition information of the data packet of each vehicle brand with the current data edition information of the data packet of this vehicle brand so as to determine whether the latest data edition of the data packet of each vehicle brand is superior to the current data edition of the data packet of this vehicle brand;

a prompting module for, in case that there is any vehicle brand whose latest data edition of the data packet is superior to the current data edition of the data packet of this vehicle brand, prompting that there is an update for the data edition of the data packet of this vehicle brand;

a downloading module for downloading the data packet of this vehicle brand for which there is an update for data edition; and a data updating module for installing the data packet of this vehicle brand to the diagnosing apparatus terminal and replacing the current data edition information of the data packet of this vehicle brand in the diagnosing apparatus terminal with the latest data edition information of the data packet of this vehicle brand.

Optionally, a determining module is also comprised for determining whether the downloaded data packet is complete; if the data packet is not complete, the downloading is continued until the data packet is complete; and/or an informing module is also comprised for informing the user of the installation result of the data packet.

Optionally, a setting module is also comprised for setting the way in which the downloading module download the data packet; when set as automatic downloading, the downloading module automatically downloads the data packet for which there is an update for data edition; and when set as downloading according to an instruction, the downloading module downloads the data packet for which there is an update for data edition after receiving a downloading instruction.

Further, the invention further provides a vehicle diagnosing apparatus which comprises a display device and a data updating device for vehicle diagnosing apparatus as described above, wherein the display device displays an interface for selecting diagnosing items, and the interface provides a plurality of diagnosing items in the way of icons; when there is any data packet whose latest data edition is superior to the current data edition of this data packet, the prompting module prompts that there is an update for the data edition of this data packet by displaying an icon of the diagnosing item associated with this data packet on the interface remarkably.

Optionally, the interface is a human-machine interface for receiving a touch operation instruction to trigger an operation of the downloading module and/or the data updating module.

In the data updating method and device for vehicle diagnosing apparatus as well as the vehicle diagnosing apparatus according to the invention, when the diagnosing apparatus terminal is connected to the data server via network, all the latest data edition information is pushed automatically to the diagnosing apparatus terminal by the data server with no need to firstly initiate a request for updating data by users, thus simplifying user's operation process; if the diagnosing apparatus terminal finds data that needs to be updated through comparison and determination, the diagnosing apparatus terminal will automatically prompts the user that there is an update for the data edition, thus avoiding a situation in which the user is deterred from acquiring the latest data due to unawareness of data updating; in addition, since the downloading and installing of data packets usually take a long time, the timing for downloading data packets can be differentiated according to user's requirements, thus ensuring an appropriate downloading timing and installing timing for user to choose without having an influence on a normal use of the diagnosing apparatus by user.

In order that the features and technical contents can be further understood, reference is now made to the following detailed description and accompanying drawings of the invention. However, these drawings are provided merely for the purpose of reference and explanation and not for limiting the invention in any way.

BRIEF DESCRIPTION OF THE DRAWINGS

The above and other aspects of the application will be more fully understood and appreciated through a detailed description given below with reference to the accompanying drawings, in which:

FIG. 1 is a schematic view showing the functional modules of the data updating device for vehicle diagnosing apparatus according to the invention.

DETAILED DESCRIPTION OF THE UTILITY MODEL

In order to aid those skilled in the art in precisely understanding the subject matter claimed by the invention, specific embodiments of the invention will be described below with reference to the accompanying drawings.

The invention provides a data updating method for vehicle diagnosing apparatus, which comprises the following steps:

Step (1): providing a diagnosing apparatus terminal which, when connected to a data server via network, receives the latest data edition information of one or more data packets pushed to the diagnosing apparatus terminal by the data server. At this step, when the data server finds that there is a diagnosing apparatus terminal connected thereto via network, for example, when the data server detects a handshaking signal sent from the diagnosing apparatus terminal, the data server actively pushes the latest data edition information to the diagnosing apparatus terminal.

In the related art documents, the updating of data usually has to be initiated actively by the user through the diagnosing apparatus terminal. However, it would be difficult for an ordinary user to realize when a request for updating data needs to be initiated. For this reason, the data in the vehicle diagnosing apparatus will generally not updated timely, thus affecting working efficiency. A change is made at step (1) of the invention, that is, the data server actively pushes the latest data edition information to the diagnosing apparatus terminal, thus effective solving the above problem.

In addition, in the present specific embodiment, the plurality of data packets are classified based on the brands of vehicles. When connected to the data server via network, the diagnosing apparatus terminal receives the latest data edition information of the plurality of data packets classified based on the brands of vehicles pushed actively by the data server. In this way, in subsequent process, users can selectively pay attention to data variation of one or some of the vehicle brands and ignore data variation of other vehicle brands. As compared to paying attention to all the data without discrimination, the data packet that needs to be downloaded and installed in the subsequent step in the present specific embodiment is smaller, thus making it possible to further save time of data updating and having a lower demand on network.

It can be understood that the technical solution of the invention is not limited to classifying the plurality of data packets based on vehicle brands. As actually required, in other embodiments of the invention, the data edition information can be not classified, and when any latest data edition information is updated, the updating is prompted and a downloading is provided so that users can acquire comprehensive data updating information; alternatively, other ways of classifying data packets can be used as required, e.g., the data packets can be classified based on vehicle symbols, automotive companies, automobile models, vehicle brands, automobile categories, car series, etc.

Step (2): the diagnosing apparatus terminal compares the latest data edition information of the data packet of each vehicle brand with the current data edition information of the data packet of this vehicle brand so as to determine whether the latest data edition of the data packet of each vehicle brand is superior to the current data edition of the data packet of this vehicle brand.

Step (3): if there is any vehicle brand whose latest data edition of the data packet is superior to the current data edition of the data packet of this vehicle brand, the diagnosing apparatus terminal prompts that there is an update for the data edition of the data packet of this vehicle brand in a remarkable way of display, wherein the remarkable way of display comprises but is not limited to: highlighting, font bold, dynamic displaying, color changing and element adding, etc. It can be understood that at this step, the way in which the diagnosing apparatus terminal prompts that there is an updated for the data edition of the data packet comprises but is not limited to: visual prompt, audio prompt, vibration prompt or a combination of two or more of these ways.

Step (4): the diagnosing apparatus terminal downloads the data packet of the vehicle brand for which there is an update for data edition. In the present specific embodiment, the users are allowed to set the way in which the diagnosing apparatus terminal downloads the data in advance. For example, users can set the way of downloading data as automatic downloading or downloading according to an instruction. When the way of downloading data is set as automatic downloading, the downloading process is completed automatically without need for user's operation, as long as downloading is allowed by network. When the way of downloading data is set as downloading according to an instruction, after the diagnosing apparatus terminal prompts the user that the data edition has been updated, the user determines the timing of downloading by himself, and the diagnosing apparatus terminal will not perform downloading until receiving a downloading instruction sent by the user, thus giving a greater degree of freedom to the user. The way in which the user sends the instruction comprises but is not limited to: sending by an input device such as touch screen, keyboard, mouse, etc., or sending via voice.

It can be understood that in some embodiments, setting the way in which the diagnosing apparatus terminal downloads the data is not necessary, and the items for setting the way of downloading data are not limited to automatic downloading or downloading according to an instruction. For example, a fixed time downloading or the like can be also used.

Step (5): the diagnosing apparatus terminal installs the data packet of the vehicle brand that needs to be updated and replaces the current data edition information of the data packet of this vehicle brand in the diagnosing apparatus terminal with the latest data edition information of the data packet of this vehicle brand. Also in the present specific embodiment, the users are allowed to set the way in which the diagnosing apparatus terminal installs the data in advance. For example, users can set the way of installing data as automatic installing or installing according to an instruction. When the way of installing data is set as automatic installing, the installing process is subsequently completed automatically after downloading is completed without need for user's operation. When the way of installing data is set as installing according to an instruction, after the downloading is completed by the diagnosing apparatus terminal, the user determines the timing of installing by himself, and the diagnosing apparatus terminal will not perform installing until receiving an installing instruction sent by the user, thus giving a greater degree of freedom to the user. The way in which the user sends the instruction comprises but is not limited to: sending by an input device such as touch screen, keyboard, mouse, etc., or sending via voice.

It can be understood that in some embodiments, setting the way in which the diagnosing apparatus terminal installs the data is not necessary, and the items for setting the way of installing data are not limited to automatic installing or installing according to an instruction. For example, a fixed time installing or the like can be also used.

In some embodiments, a determining step is also comprised before step (5) for determining whether the downloaded data packet is complete; if the data packet is not complete, the downloading is continued until the data packet is complete. This step facilitates avoiding a situation in which a subsequent installing procedure can not be smoothly performed due to an incomplete downloaded data packet caused by such reasons as a non-smooth network, and/or an informing step is also comprised after step (5) for informing the user of the installation result of the data packet. The installation result may comprise but is not limited to: success or failure of installation, installing time, installation edition, etc. This step enables the user to know about the installing conditions of data packet more explicitly.

FIG. 1 is a schematic view showing the functional modules of the data updating device for vehicle diagnosing apparatus according to the invention. As shown in FIG. 1, a data updating device 100 for vehicle diagnosing apparatus is provided in a diagnosing apparatus terminal 200 and comprises an information receiving module 101, a comparing module 102, a prompting module 103, a downloading module 104 and a data updating module 105. Specifically, the information receiving module 101 is used for receiving the latest data edition information of one or more data packets pushed to the diagnosing apparatus terminal 200 by a data server 300 when the diagnosing apparatus terminal 200 is connected to the data server 300 via network. The comparing module 102 is used for comparing the latest data edition information of the one or more data packets with the current data edition information of the one or more data packets in the diagnosing apparatus terminal respectively so as to determine whether the latest data edition of each data packet is superior to the current data edition of this data packet. The prompting module 103 is used for, in case that there is any data packet whose latest data edition is superior to the current data edition of this data packet, prompting that there is an update for the data edition of this data packet. The downloading module 104 is used for downloading the data packet corresponding to the latest data edition to the diagnosing apparatus terminal 200 from the data server 300. The data updating module 105 is used for installing this data packet to the diagnosing apparatus terminal 200 and replacing the current data edition information of this data packet in the diagnosing apparatus terminal 200 with the latest data edition information of this data packet.

In the present embodiment, the plurality of data packets are classified based on the brands of vehicles. At this time, the information receiving module 101 is used for receiving the latest data edition information of a plurality of data packets classified based on the brands of vehicles pushed to the diagnosing apparatus terminal 200 by the data server 300 when the diagnosing apparatus terminal 200 is connected to the data server 300 via network. The comparing module 102 is used for comparing the latest data edition information of the data packet of each vehicle brand with the current data edition information of the data packet of this vehicle brand so as to determine whether the latest data edition of the data packet of each vehicle brand is superior to the current data edition of the data packet of this vehicle brand. In case that there is any vehicle brand whose latest data edition of the data packet is superior to the current data edition of the data packet of this vehicle brand, the prompting module 103 prompts that there is an update for the data edition of the data packet of this vehicle brand in a remarkable way of display. The downloading module 104 is used for downloading the data packet of this vehicle brand for which there is an update for data edition to the diagnosing apparatus terminal 200. The data updating module 105 is used for installing the data packet of this vehicle brand to the diagnosing apparatus terminal 200 and replacing the current data edition information of the data packet of this vehicle brand in the diagnosing apparatus terminal 200 with the latest data edition information of the data packet of this vehicle brand.

The way in which the diagnosing apparatus terminal 200 is connected to the data server 300 via network comprises wired connection or wireless connection.

In other embodiments, the data updating device 100 for vehicle diagnosing apparatus may further comprise:
 a determining module (not shown) for determining whether the downloaded data packet is complete; if the data packet is not complete, the downloading is continued until the data packet is complete;
 an informing module (not shown) for informing the user of the installation result of the data packet. The installation result can be success or failure of installation, installing time, installation edition, etc.
 a setting module (not shown) for setting the way in which the downloading module 104 downloads the data packet and/or the way in which the data updating module 105 updates data.

The diagnosing apparatus terminal 200 and a display device (not shown) together constitute the vehicle diagnosing apparatus of the invention. In this apparatus, the display device provides an interface for selecting diagnosing items, and the interface provides a plurality of diagnosing items in the way of icons; when there is any data packet whose latest data edition is superior to the current data edition of this data packet, the prompting module 103 prompts that there is an update for the data edition of this data packet by displaying an icon of the diagnosing item associated with this data packet on the interface remarkably. En some embodiments, the interface is a human-machine interface. When downloading and/or installing is performed according to an instruction, the user can send the instruction through a touch operation on the icon on the interface so as to trigger the downloading performed by the downloading module 104 and/or data updating performed by the data updating module 105.

While the application has been illustrated and described based on certain embodiments, the application is not limited to the details illustrated. Instead, the various details of the application can be modified within the scope of claims and equivalents thereof.

The invention claimed is:

1. A method for updating data for a vehicle diagnosing apparatus, the method comprising:
 (1) receiving, with at least one processor of a diagnosing apparatus terminal connected to a data server via a network, latest data edition information of at least one data packet, the latest data edition information being pushed to the diagnosing apparatus terminal by the data server, the diagnosing apparatus terminal having the at least one processor and associated non-transitory memory which stores program instructions which are executed on the at least one processor;

(2) comparing, with the at least one processor of the diagnosing apparatus terminal, the latest data edition information of the at least one data packet with current data edition information of the at least one data packet;

(3) prompting, with the at least one processor of the diagnosing apparatus terminal, that there is an update for the at least one data packets in response to the latest data edition information of the at least one data packet being superior to the current data edition information of the at least one of data packet;

(4) downloading, the at least one processor of with the diagnosing apparatus terminal, the at least one data packet in response to there being an update for the at least one data packet;

(5) installing, with the at least one processor of the diagnosing apparatus terminal, the downloaded at least one data packet and replacing the current data edition information of the downloaded at least one data packet in the diagnosing apparatus terminal with the latest data edition information; and (6) performing a diagnostic operation on a vehicle with the at least one processor of the vehicle diagnosing terminal using the updated at least one data packet, the diagnostic operation at least including determining a condition of the vehicle.

2. The method according to claim 1, wherein the at least one data packet includes a plurality of data packets and the plurality of data packets are classified based on the brands of vehicles.

3. The method according to claim 1, further comprising at least one of:

before step (5), with the at least one processor of the vehicle diagnosing terminal, determining whether the downloading of the at least one data packet is complete, the downloading being continued until the at least one data packet is complete; and after step (5), with the at least one processor of the vehicle diagnosing terminal, informing a user of an installation result of the downloaded at least one data packet.

4. The method according to claim 1, step (4) further comprising:

downloading, with the at least one processor of the diagnosing apparatus terminal, the at least one data packet corresponding to the latest data edition information by at least one of (i) automatically downloading the at least one data packet for which there is an update and (ii) downloading the at least one data packet for which there is an update after receiving a downloading instruction.

5. A diagnosing apparatus terminal comprising:

at least one processor and associated non-transitory memory which stores program instructions which are executed on the at least one processor, the program instructions comprising:

an information receiving module configured to cause the at least one processor to receive latest data edition information of at least one data packet pushed to the diagnosing apparatus terminal by a data server when the diagnosing apparatus terminal is connected to the data server via network;

a comparing module configured to cause the at least one processor to compare the latest data edition information of the at least one data packet with current data edition information of the at least one data packet in the diagnosing apparatus terminal;

a prompting module configured to cause the at least one processor to prompt that there is an update for the at least one data packet in response to the latest data edition information of the at least one data packet being superior to the current data edition information of the at least one data packet;

a downloading module configured to cause the at least one processor to download the at least one data packet to the diagnosing apparatus terminal in response to there being an update for the at least one data packet; and a data updating module configure to cause the at least one processor to install the at least one data packet to the diagnosing apparatus terminal and replace the current data edition information of the at least one data packet in the diagnosing apparatus terminal with the latest data edition information, wherein the vehicle diagnosing terminal is configured to perform a diagnostic operation on a vehicle using the updated at least one data packet, the diagnostic operation at least including determining a condition of the vehicle.

6. The diagnosing apparatus terminal according to claim 5, wherein the at least one data packet includes a plurality of data packets and the plurality of data packets are classified based on the brands of vehicles.

7. The diagnosing apparatus terminal according to claim 5, the program instructions further comprising at least one of:

a determining module configure to cause the at least one processor to determine whether the downloading of the at least one data packet is complete, the downloading being continued until the at least one data packet is complete; and an informing module configured to cause the at least one processor to inform a user of an installation result of the downloaded at least one data packet.

8. The diagnosing apparatus terminal according to claim 5, the program instructions further comprising:

a setting module configured to cause the at least one processor to set a way in which the downloading module downloads the at least one data packet, when set as automatic downloading, the downloading module automatically downloads the at least data packet for which there is an update and, when set as downloading according to an instruction, the downloading module downloads the data packet for which there is an update after receiving a downloading instruction.

9. A vehicle diagnosing apparatus comprising:

a diagnosing apparatus terminal having at least one processor and associated non-transitory memory which stores program instructions which are executed on the at least one processor, the program instructions comprising:

an information receiving module configured to cause the at least one processor to receive latest data edition information of at least one data packet pushed to the diagnosing apparatus terminal by a data server when the diagnosing apparatus terminal is connected to the data server via network;

a comparing module configured to cause the at least one processor to compare the latest data edition information of the at least one data packet with the current data edition information of the at least one data packet in the diagnosing apparatus terminal;

a prompting module configured to cause the at least one processor to prompt that there is an update for the at least one data packet in response to the latest data edition information of the at least one data packet being superior to the current data edition information of the at least one data packet;

a downloading module configured to cause the at least one processor to download the at least one data packet to the diagnosing apparatus terminal in response to there being an update for the at least one data packet; and a data updating module configure to cause the at least one processor to install the at least one data packet to the diagnosing apparatus terminal and replace the current data edition information of the at least one data packet in the diagnosing apparatus terminal with the latest data edition information; and a display device configured to display an interface for selecting diagnosing items, the interface providing a plurality of diagnosing items in the way of icons, wherein the vehicle diagnosing terminal is configured to perform a diagnostic operation on a vehicle using the updated at least one data packet, the diagnostic operation at least including determining a condition of the vehicle, wherein the prompting module of the diagnosing apparatus terminal is configured to prompt that there is an update for the data edition information of the at least one data packet by displaying an icon of the diagnosing item associated with the at least one data packet on the interface.

10. A vehicle diagnosing apparatus according to claim 9, wherein the interface is a human-machine interface configured to receive a touch operation instruction to trigger an operation of at least one of the downloading module and the data updating module.

* * * * *